Dec. 3, 1940.   J. F. HEUBERGER   2,223,518
BEARING
Filed Jan. 18, 1937
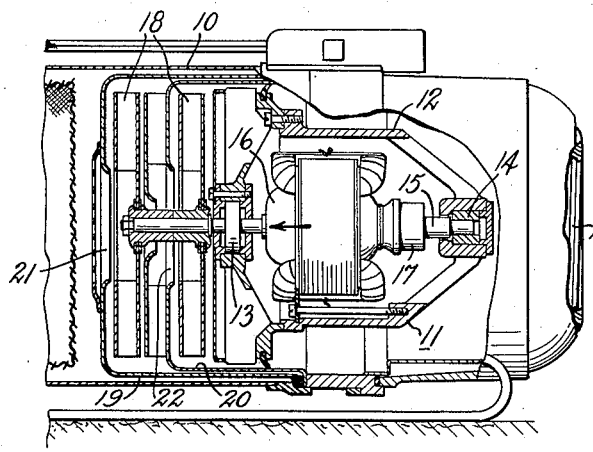
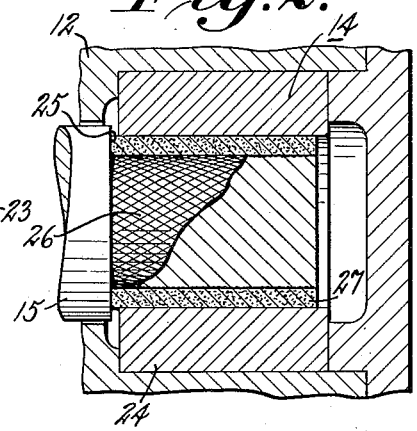
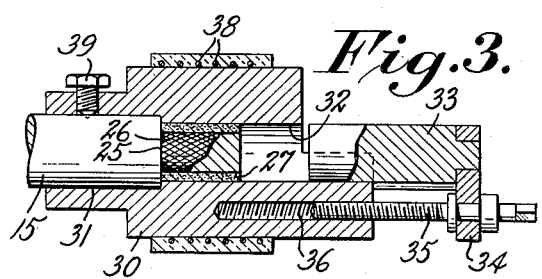
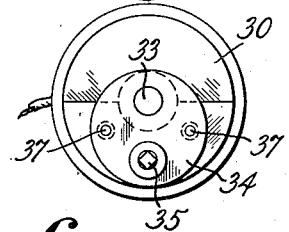
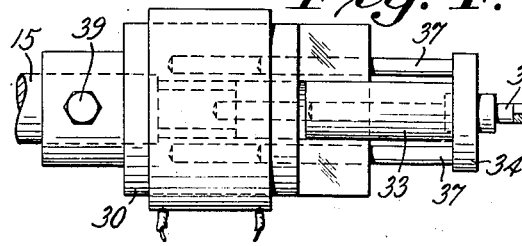
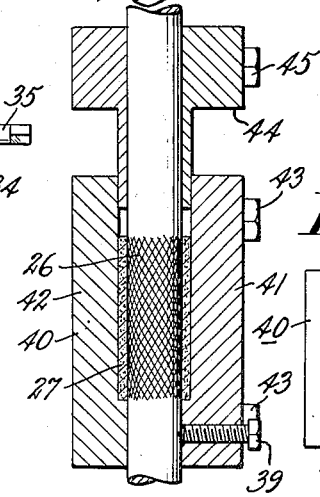
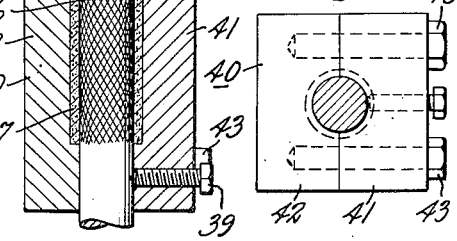
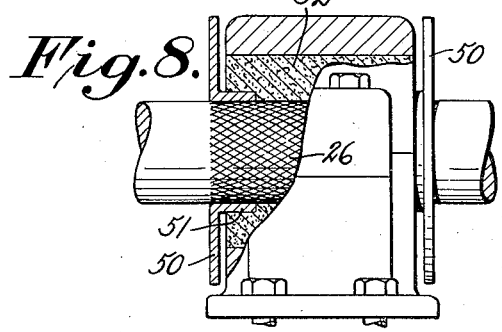
INVENTOR.
Josef Friedrich Heuberger
BY Thomas C. Betts
his ATTORNEY.

Patented Dec. 3, 1940

2,223,518

UNITED STATES PATENT OFFICE 2,223,518

BEARING

Josef Friedrich Heuberger, Stockholm, Sweden, assignor to Electrolux Corporation, Dover, Del., a corporation of Delaware Application January 18, 1937, Serial No. 121,037
In Germany January 21, 1936

2 Claims. (Cl. 308—238)

My invention relates to bearings and more particularly to an improved bearing for use especially in connection with the motor fan unit of a vacuum cleaner. However, it is equally applicable to other devices wherein like conditions exist, as will be apparent as the description of my invention proceeds.

The motor fan unit of a vacuum cleaner includes a single shaft upon which is mounted both the motor armature and the fan rotor or rotors. This shaft is mounted in bearings carried by the motor housing. The armature is mounted on a portion of the shaft between the two bearings, while the rotor is secured to an overhung portion of the shaft. The shaft is subjected to radial load resulting from the weight of the rotating parts, if the shaft is mounted in a horizontal direction, and is also subjected to an axial load resulting from the reaction of the air against the rotor.

Heretofore it has been almost universal practice to employ only ball bearings for mounting the shaft. Ball bearings have the advantage that they operate with but a small frictional loss and may be packed with sufficient grease when the unit is assembled so that it is not necessary to renew the lubricant. At least one of the ball bearings is designed so as to take thrust, while the other ball bearing may or may not be capable of absorbing thrust. In any event, it is practically impossible to so accurately dimension the parts that both bearings will be subjected to the thrust load. The result is that any clearance in the bearing not subjected to thrust will result in noisy operation. The effect of the thrust on the other bearing will prevent the occurrence of any clearance therein, but the noise produced by the loose bearing is sufficient to be highly objectionable.

In accordance with my invention one ball bearing is employed and is arranged to take both thrust and radial load. The other bearing, which is not subjected to thrust, is a sliding journal bearing, and my invention is particularly directed to an improved form of this bearing.

One of the objects of my invention is to provide a sliding journal bearing in which one of the bearing members is made of a material which is capable of retaining sufficient lubricant for operation of the bearing over long periods of time. I have discovered that greatly improved lubrication is obtained if this member is made the rotating bearing member, rather than the stationary one.

Another object of my invention is the provision of an improved method of applying such a bearing member to the shaft.

Further objects and advantages will be apparent from the following description considered in connection with the accompanying drawing which forms a part of this specification and of which:

Fig. 1 is a view chiefly in cross-section, showing my invention applied to the motor fan unit of a vacuum cleaner;

Fig. 2 is a cross-sectional view on an enlarged scale of the improved bearing in accordance with my invention;

Fig. 3 is a cross-sectional view of an apparatus used in the manufacture of the bearing;

Fig. 4 is a top view of the device shown in Fig. 3;

Fig. 5 is an end view of the device shown in Fig. 3;

Fig. 6 is a cross-sectional view of a modified arrangement which may be used in the manufacture of the bearing.

Fig. 7 is an end view of the device shown in Fig. 6, and

Fig. 8 is a cross-sectional view of a modified form of bearing in accordance with my invention.

Referring more particularly to Fig. 1, reference character 10 designates generally the casing of a vacuum cleaner within which is suitably mounted an electric motor 11. Motor 11 includes a housing 12 in which are mounted bearings 13 and 14 supporting the armature shaft 15. Bearing 13 is a well known type of ball bearing which is capable of sustaining both axial and radial loads. Bearing 14 is constructed in accordance with my invention and will be described in detail in the following.

Mounted on shaft 15 within the motor housing are armature windings 16 and a commutator 17. Mounted on a portion of shaft 15 which overhangs bearing 13 are a pair of fan rotors 18. Rotors 18 are disposed within a fan housing including members 19 and 20. Member 19 is formed with an inlet opening 21 for the forward rotor, while member 20 is formed with an inlet 22 for the rear rotor. Air discharged from the rear rotor passes through the motor housing, to thereby cool the motor, and is discharged from the casing 10 through an exhaust opening 23.

As shown more particularly in Fig. 2, bearing 14 includes a stationary bearing ring 24 supported by the motor housing. The end of shaft 15 is turned down so as to provide a shoulder 25 and the turned down portion is roughened, knurled or serrated as is indicated at 26. A bearing sleeve 27 is secured to a serrated portion of the shaft in a manner to be described hereinafter. Sleeve 27 is made of a plastic material which may contain graphite, or the material may be porous and impregnated with oil. In either case the graphite or the oil serves for lubricating the bearings.

In operation rotation of the rotors 18 causes flow of air from the inlet 21 of the fan housing in a general direction towards the right as viewed in Fig. 1, to the exhaust opening 23. This results in a thrust load being imposed on armature shaft 15 in the direction of the arrow shown in Fig. 1. This thrust load is taken by the ball bearing 13. The weight of the rotating parts results in a radial load being imposed on both the bearings 13 and 14. Any clearance present in the ball bearing is taken up by the thrust load and consequently this bearing operates substantially without noise. The nature of the bearing 14 is such that excessive clearance may be avoided and consequently the operation of this bearing is substantially noiseless. The lubricant contained in the material of bearing sleeve 24 provides adequate lubrication for bearing 14. As before stated, I have found that the lubrication is greatly improved if the sleeve 27 is secured to the rotating shaft, instead of being secured to the stationary bearing member 24.

In Figs. 3 through 5 there is illustrated an apparatus for applying sleeve 27 to shaft 15. As shown, this apparatus includes a die or mould 30 formed with a central bore having a portion 31 of substantially the same diameter as the main part of shaft 15, and having a portion 32 of a diameter equal to the desired outer diameter of sleeve 27. A plunger 33 of substantially the same diameter as portion 32 of the bore is arranged to be forced thereinto. The outer end of plunger 33 is connected to a member 34 through which extends bolt 35. The bolt is rotatable within member 34 but is not axially movable wth respect thereto. Bolt 35 engages a threaded hole 36 in die 30. Consequently, rotation of the bolt in the proper direction causes plunger 33 to advance into portion 32 of the bore and, by virtue of the screw threads, the plunger may exert a large force. Guide rods 37 may be secured to member 34 and arranged to slide in smooth openings formed in die 30. A heating coil 38 is provided with die 30.

In operation, the shaft 14, after the turned down portion thereof has been serrated, as shown at 26, is inserted into the bore of die 30 and is secured in place by means of a set screw 39 with its shoulder 25 abutting against the shoulder formed in the die at the juncture of portions 31 and 32 of the bore. Plastic material, for instance, synthetic resin in powdered form or in the form of tablets is introduced into the portion 32 of the bore, the plunger 33 being withdrawn. The die is now heated by the heating coil 38 and the powder or tablets softened to plastic form. Plunger 33 is now forced into the bore by rotating bolt 35 in the proper direction and compresses the plastic material into the space between the serrated portion of the shaft and the bore. The plastic material is, of course, forced into the irregularities in the surface of the shaft formed by the serrations, and, when permitted to cool, is rigidly secured to the shaft. If graphite is to be incorporated in the material of the sleeve this is placed in the bore at the same time the powder or tablets are placed therein, and is compressed into the material by the plunger 33.

The apparatus shown in Figs. 6 and 7 is similar to that shown in Figs. 3 to 5, with the exception that the die 40 is made in two parts, 41 and 42, which are joined along the center line of the bore, and are secured together by means of bolts 43. Also plunger 44 is hollow so as to permit it to surround the shaft. The plunger is also made in two parts which are secured together by means of bolt 45. Thus, the bearing sleeve may be applied to an intermediate portion of a shaft. Inasmuch as the die and plunger are made in two parts, it is not even necessary to slip them over the end of the shaft, and thus they could be used on shafts having enlarged ends.

In Fig. 8, there is shown a bearing made in accordance with the present invention in which radial flanges 50 are secured to the shaft immediately adjacent the bearing. As shown, these flanges are provided with collars 51 which are imbedded in the sleeve 52 of plastic material, the plastic material being placed around them when the bearing is constructed. These flanges serve the dual purpose of providing a heat dissipating surface for cooling the bearing and prevent access of dust or other foreign particles to the bearing surface.

While I have shown and described my invention as applied to the motor fan unit of a vacuum cleaner, it will be evident that its usefulness is by no means confined thereto. The scope of my invention is to be limited only by the appended claims when interpreted in the light of the prior art.

What I claim is:

1. In a bearing for a rotatable shaft, a stationary outer bearing ring having a bearing surface, and a sleeve of porous material secured to said shaft and providing a bearing surface cooperating with the bearing surface of said ring, said porous material being adapted to retain lubricant for lubricating said surfaces.

2. In a bearing for a rotatable shaft, a stationary outer bearing ring having a bearing surface, said shaft being formed with a serrated portion, and a sleeve of plastic porous material secured to said shaft by the aid of the serrations and providing a bearing surface cooperating with the bearing surface of said ring, said porous material being impregnated with lubricant for lubricating said bearing surface.

JOSEF FRIEDRICH HEUBERGER.